UNITED STATES PATENT OFFICE.

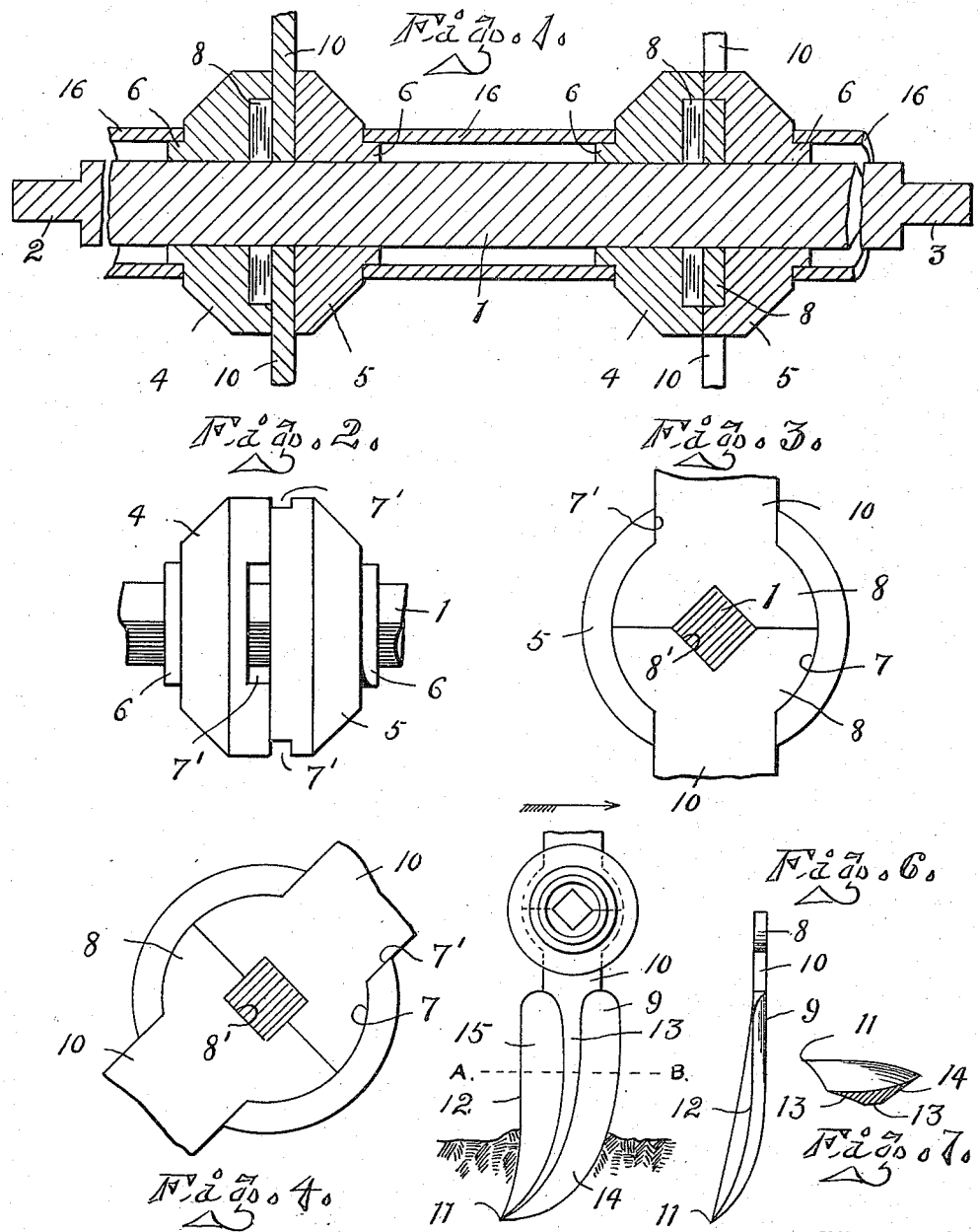

MATT STROM AND ERIC HOGLUND, OF DULUTH, MINNESOTA.

SOIL-CULTIVATING TOOL.

1,155,289.  Specification of Letters Patent. Patented Sept. 28, 1915.

Application filed April 17, 1915. Serial No. 22,069.

*To all whom it may concern:*

Be it known that we, MATT STROM and ERIC HOGLUND, MATT STROM being a citizen of the United States and ERIC HOGLUND a subject of the Czar of Russia, both residing in Duluth, in the county of St. Louis and State of Minnesota, have invented certain new and useful Improvements in Soil-Cultivating Tools, of which the following is a specification, reference being had therein to the accompanying drawing.

This invention relates to improvements in soil cultivating tools, and more particularly to rotary blade cultivating gangs, which may be applied to any ordinary cultivator of either the single or double rowed type.

The object of our invention is to provide a simple and effective tool of this nature and one composed of a plurality of parts, whereby in the event of breakage or wear from prolonged use, any individual part may be quickly removed or replaced.

Another object of our invention is to provide a tool of this nature, any number of which may be placed on the shaft of an ordinary cultivator of the single or double rowed type.

Other objects and advantages of the present improvement will be set forth in the following description and drawings, in which—

Figure 1, is a vertical sectional view through a fragmental portion of a tool supporting shaft having two of our improved hubs mounted thereon. Fig. 2 is a side elevation of one of the hubs with the soil engaging blades removed. Fig. 3 is a side elevation of the inside face of one side of one of the hubs. Fig. 4 is an elevation of the inside face of one side of one of the hubs, showing the blades arranged at a different angle in relation to the shaft. Fig. 5 is a side elevation of one of the blades attached within the hub. Fig. 6 is an edge elevation of one of the blades. Fig. 7 is a fragmental cross sectional view of one of the blades, taken on the line A—B, Fig. 5, and looking toward the point of the blade.

Referring now to the drawings in which like numerals designate similar parts, 1 represents a metal shaft, square in cross-section throughout its entire length, with the exception of its extreme ends 2 and 3, which are cylindrical in shape and designed to be journaled within any suitable form of frame, such as are common in the art of agricultural harrows.

Upon the shaft 1 is slidably mounted cultivator blade supporting hubs, comprising two coöperating halves 4 and 5, both of which are mounted upon the shaft 1. The said halves 4 and 5 are each provided with outwardly projecting bosses 6, which provide a locking means, as will be hereinafter described.

The inside face of each member 4 and 5 is recessed a fractional portion of its depth and completely around the circumference of the opening therein for the passage of the shaft 1. This forms a circular reception chamber 7, in each member 4 and 5, within which the hub-ends 8 of the cultivator blades 9 are placed.

At two points radially opposite and upon the inner face of each hub-member 4 and 5, the circular recessed hub-chamber 7 extends completely to the circumferential edge of the hub-member and at a uniform depth throughout, thus providing a slot 7' to receive a shank 10 of the cultivator blade 9.

The extreme end of the hub end 8 of each cultivator blade is formed with an opening or cutout portion 8' midway its radius, the cutout portions registering with and fitting around one-half of the shaft 1, which passes through the hub.

When the blades are in place and the members 4 and 5 assembled upon the shaft, the cutout portions 8' completely surround the shaft and the blades are diametrically opposed.

As will be readily seen the blades can radiate from either one of the two opposite sides or from either one of the two opposite corners of the square shaft, but that the blades will always be in alinement transverse the shaft.

In operation it is preferred to have mounted, in alternation, upon a single shaft, at least two hubs having their blades in each of the constructions set out above so that cultivator blades will extend radially from all corners and sides of the shaft, or in eight radial directions, thus producing as easy a rotation of the device upon the soil as is possible and presenting the greatest number of cultivating blades.

The cultivator blades 9 are formed of relatively thin metal, preferably steel, having the hub portion 8 and the shank 10, as previously described. The soil engaging portion of the blade being constructed somewhat wider than the shank for a considerable portion of its length and then tapering gradually to a point 11, which extends somewhat beyond a plane transverse the front edge 12 of the blade and also considerably to one side of a plane parallel with one side of the shank 10. This forms a somewhat concave spoon-like blade for engagement with the soil and which upon receding therefrom has a tendency to turn over the soil engaged by the face of the blade.

The back of the blade is reinforced by being formed with the strengthening rib 13, extending its entire length from the shank 10 to the point 11, and from which the sides 14 and 15 of the back taper laterally and terminate in the cutting edges, as seen in Fig. 7.

A tube 16, which is of a size to snugly fit over the bosses 6 upon the ends of the hub-members and to completely surround the shaft 1, is placed intermediate each pair of blade supporting hubs, thus providing a smooth, simple and efficient spacing means intermediate the hubs.

Having thus described our invention, what we claim and desire to secure by Letters Patent is:

1. A soil cultivating tool comprising a rotatable shaft of rectangular cross-section, a plurality of hubs mounted upon the said shaft, said hubs composed of two similarly constructed abutting halves, the inner faces of the abutting halves having central depressed portions, and radial grooves connecting the depressed portions and the outer periphery of each half of the hub, cultivator blades having their inner ends of a size and shape to fit within the central depressed portion and their shank of a size to fit within the radial groove, and means engaging each half of the hubs for holding the cultivator blades between them.

2. A soil cultivating tool comprising a rotatable shaft of rectangular cross section, a plurality of hubs mounted upon the said shaft, said hubs composed of two similarly constructed abutting halves, the abutting faces of the said halves having central depressed portions and two oppositely arranged radial grooves of a depth equal to the depth of the central depressed portion and connecting the said portion and the outer periphery of the said halves, cultivator blades having their inner ends provided with a semi-circular hub portion adapted to fit within one-half of the depressed portion of the hub, and a shank of a size to fit within one of the radial grooves, the inner edge of the hub end of each blade having an opening of a size to fit around one half of the rectangular shaft, and means engaging each half of each hub to hold the hub ends of the blades within the central depressed portions of the hub, the parts arranged as and for the purpose described.

In testimony whereof we hereunto affix our signatures in the presence of two witnesses.

MATT STROM.
ERIC HOGLUND.

Witnesses:
ANDREW C. DUNN,
S. GEO. STEVENS.

Copies of this patent may be obtained for five cents each, by addressing the "Commissioner of Patents, Washington, D. C."